(12) United States Patent
Tomkow

(10) Patent No.: US 9,160,725 B2
(45) Date of Patent: Oct. 13, 2015

(54) COMPUTER IMPLEMENTED SYSTEM AND METHOD FOR AUTHENTICATING A SENDER OF ELECTRONIC DATA TO A RECIPIENT

(71) Applicant: RPOST COMMUNICATIONS LIMITED, Pembroke (BM)

(72) Inventor: Terrance A. Tomkow, Los Angeles, CA (US)

(73) Assignee: RPOST COMMUNICATIONS LIMITED, Pembroke (BM)

( * ) Notice: Subject to any disclaimer, the term of this patent is extended or adjusted under 35 U.S.C. 154(b) by 0 days.

(21) Appl. No.: 13/624,769

(22) Filed: Sep. 21, 2012

(65) Prior Publication Data

US 2013/0086654 A1    Apr. 4, 2013

Related U.S. Application Data

(60) Provisional application No. 61/538,669, filed on Sep. 23, 2011, provisional application No. 61/538,772, filed on Sep. 23, 2011.

(51) Int. Cl.
*G06F 7/04* (2006.01)
*H04L 29/06* (2006.01)

(52) U.S. Cl.
CPC ............. *H04L 63/08* (2013.01); *H04L 63/126* (2013.01)

(58) Field of Classification Search
CPC .... H04L 63/0823; H04L 51/12; H04L 9/3247
USPC ....................................................... 709/206
See application file for complete search history.

(56) References Cited

U.S. PATENT DOCUMENTS

| 4,933,969 | A | | 6/1990 | Marshall et al. |
| 5,530,757 | A | | 6/1996 | Krawczyk |
| 5,553,145 | A | | 9/1996 | Micali |
| 5,606,609 | A | | 2/1997 | Houser |
| 5,615,268 | A | | 3/1997 | Bisbee et al. |
| 5,661,805 | A | | 8/1997 | Miyauchi |
| 5,673,316 | A | | 9/1997 | Auerbach et al. |
| 5,748,738 | A | | 5/1998 | Bisbee et al. |
| 5,781,629 | A | | 7/1998 | Haber et al. |
| 5,872,848 | A | * | 2/1999 | Romney et al. ............... 713/176 |
| 5,892,909 | A | | 4/1999 | Grasso et al. |
| 5,915,024 | A | | 6/1999 | Kitaori et al. |

(Continued)

FOREIGN PATENT DOCUMENTS

WO        0110090 A1    2/2001

OTHER PUBLICATIONS

B. Al-Hammadi et al., Certified Exchange of Electronic Mail (CEEM), Proceedings IEEE Southeastcon '99, Mar. 25-28, 1999.

(Continued)

*Primary Examiner* — Shewaye Gelagay
*Assistant Examiner* — Khoi Le
(74) *Attorney, Agent, or Firm* — Rutan & Tucker LLP; John K. Fitzgerald

(57) ABSTRACT

A sever receives data from a sender to be dispatched to a recipient. Before dispatching the data to the recipient the server sends a message to the sender's email address requesting a response which will confirm the sender's authorship of the data. Upon receiving the confirmation about sender's authorship of the data, the server transmits the data together with an identification of the sender to the recipient.

16 Claims, 2 Drawing Sheets

(56) References Cited

U.S. PATENT DOCUMENTS

| | | | |
|---|---|---|---|
| 5,926,550 A | 7/1999 | Davis | |
| 6,115,735 A | 9/2000 | Saito et al. | |
| 6,182,219 B1* | 1/2001 | Feldbau et al. | 713/176 |
| 6,199,052 B1* | 3/2001 | Mitty et al. | 705/75 |
| 6,237,096 B1 | 5/2001 | Bisbee et al. | |
| 6,393,566 B1 | 5/2002 | Levine | |
| 6,470,448 B1 | 10/2002 | Kuroda et al. | |
| 6,643,687 B1 | 11/2003 | Dickie et al. | |
| 6,760,752 B1 | 7/2004 | Liu et al. | |
| 6,868,498 B1* | 3/2005 | Katsikas | 726/14 |
| 6,898,625 B2 | 5/2005 | Henry et al. | |
| 7,577,834 B1* | 8/2009 | Traversat et al. | 713/156 |
| 8,126,971 B2* | 2/2012 | Shuster | 709/206 |
| 8,275,845 B2 | 9/2012 | Tomkow | |
| 8,280,967 B2* | 10/2012 | Almeida | 709/206 |
| 2002/0116608 A1* | 8/2002 | Wheeler et al. | 713/155 |
| 2005/0021633 A1 | 1/2005 | Venkatraman et al. | |
| 2005/0055410 A1* | 3/2005 | Landsman et al. | 709/206 |
| 2005/0210256 A1* | 9/2005 | Meier et al. | 713/176 |
| 2008/0307513 A1* | 12/2008 | Chow et al. | 726/5 |

OTHER PUBLICATIONS

A. Bahreman et al., Certified Electronic Mail (CEM), In Proceedings of the 1994 Network and Distributed Systems Security Conference, Feb. 1994.

Michael A. Gurski, Privacy-Enhanced Mail ("PEM"), Oct. 24, 1995, available at: http://www.csee.umbc.edu/~woodcock/cmsc482/proj1/pem.html.

J. Linn, Privacy Enhancement for Internet Electronic Mail: Part I: Message Encryption and Authentication Procedures, Network Working Group Request for Comments 1421 (Feb. 1993), http://tools.ietf.org/html/rfc1421.

Release notes from the 1999 version of Postfix, available at: http://web.archive.org/web/19990508202510/http:/www.postfix.org/RELEASE_NOTES.

John Markoff, Sharing Software, IBM to Release Mail Program Blueprint (Dec. 14, 1998), available at: http://www.nytimes.com/library/tech/98/12/biztech/articles/14blue.html.

Cameron Laird, Venema Aims to Make Network Software Safe (Oct. 2, 1998), available at: http://www.postfix.org/developer.199810.html.

Eric Allman, "Sendmail, Installation and Operation Guide," Sendmail, Inc., eric@Sendmail.COM, Version 8.127, for Sendmail Version 8.9, undated, 74 pgs.

David H. Crocker, "Standard for the Format of ARPA Internet Text Messages," RFC # 822, Aug. 13, 1982, Dept. of Electrical Engineering, University of Delawar, Newark, DE network: DCrocker@UDel_Relay, 50 pgs.

Jonathan B. Postal, "Simple Mail Transfer Protocol," RFC 821, Aug. 1982, Information Sciences Institute, University of Southern California, Marina del Rey, California, 72 pgs.

Siegfried Herda, "Non-repudiation: Constituting evidence and proof in digital cooperation," Computer Standards & Interfaces 17 (1995), pp. 69-79.

Stephen T. Kent, "Internet Privacy Enhanced Mail," Communications of the ACM, Aug. 1993/vol. 36, No. 8, pp. 48-60.

* cited by examiner

COMPUTER IMPLEMENTED SYSTEM AND METHOD FOR AUTHENTICATING A SENDER OF ELECTRONIC DATA TO A RECIPIENT

CROSS-REFERENCES TO RELATED APPLICATIONS

This application claims the benefit of priority from Provisional Application Nos. 61/538,669 and 61/538,772 filed Sep. 23, 2011, each of which is incorporated by reference in its entirety.

FIELD OF DISCLOSURE

The present disclosure relates to the field of transmission of messages, particularly email messages from sender(s) to receiver(s). More particularly this disclosure relates to authenticating the sender of the data prior to transmitting the data to intended recipient(s). This disclosure also relates to a system and method whereby the recipient verifies the origin of a message and authenticity of the sender before receiving a message from the sender.

BACKGROUND

In recent years e-mail has transformed into an indispensable business tool. Email once used as a mode of personal communication has extended its reach to a plurality of diversified segments including business administration, human resources management and marketing management, to name a few. Existing email functions also provide some sort of proof of delivery of the mail to the intended recipient. For example, in certain email systems senders are provided with the option of obtaining notifications about the status of their messages. i.e., when a message is delivered to the intended recipient, the sender gets a notification stating that the message has been delivered to the intended recipient. Alternatively, if the sender requests for delivery notification, the email system might provide a delivery notification to the sender. Even though the aforementioned feature (delivery reports corresponding to emails) is not mandatory, some of the email systems provide this facility. Since accountability for transmitted email is non-existent or minimal, senders are wary of the fact that their confidential emails may be delivered to non-intended recipients, and recipients are wary of the fact that they might receive emails from unidentified/unknown sources.

Therefore there is a need for an email system/method that can scrutinize the identity of at least the sender before sending the email generated by the sender.

To resolve the accountability issue, some email service providers came up with the concept of third party notifications wherein a third party would act as an intermediary between the sender and receiver. The third party would monitor the status of emails transmitted from a sender and intended for a recipient/receiver. The third party was supposed to accordingly update on the status of email to the sender. However, one of the primary disadvantages of the third party notification concept is that the email and the corresponding attachments were to be loaded on to the third party website. Such a necessity resulted in a communication method that was slow and cumbersome. Moreover, the third party systems did not have any mechanism to authenticate the sender of the message and verify that the sender is the owner of the email being transmitted. Therefore, there was felt a need for a system/method that overcame the aforementioned disadvantages. The present invention satisfies these, and other needs.

SUMMARY OF THE INVENTION

In its most general aspect, the present disclosure envisages a system and method for authenticating a sender of electronic data to a recipient. In various aspects, the present invention provides for the secure transmission of data between a sender and a recipient, and also provides proof of delivery of the message to the intended recipient. The various aspects of the present invention are advantageous in that they provide a method and system that does not require both the sender and the recipient to connect to a website to receive a message, providing a less cumbersome and faster implementation of the authentication and transmission process. In another aspect, the present invention does not require installation of any special email or data transfer software on the sender or recipient's systems to enable transmission or receipt of the email or data.

In another aspect, the present invention includes a method including the computer implemented steps of: receiving electronic data including at least an email address of the sender, from the sender, at a server remote from the sender; transmitting a message from the server to the sender's email address, wherein the message requests confirmation of sender's ownership of the transmitted electronic data; receiving at the server, a confirmation of the sender's ownership of the transmitted electronic data, wherein the confirmation is in response to the message sent from the server to the sender's email address; and transmitting from the server to a recipient a copy of the electronic data generated by the sender, and a confirmation of the identity of the sender of the electronic data.

In another aspect, the method further includes the step of transmitting the electronic data from the sender to the server, in the form of an email message.

In yet another aspect, the method further includes the step of transmitting the electronic data received from the sender to an internet web server for the purpose of delivery to the recipient.

In still another aspect, the present invention includes the step of receiving electronic data including at least an email address of the sender, and further including the step of recording at the server, a code uniquely identifying the transmitted electronic data.

In a further aspect, the present invention includes the step of transmitting a message from the server to the sender's email address and further includes the step of embedding a link to a website associated with the server in the message. In yet a further aspect, the present invention may also include the step of embedding a code uniquely identifying the transmitted electronic data into the link.

In still another aspect, the method further includes the step of confirming the sender's ownership of the transmitted data via a return electronic message.

Another aspect of the present invention may include embedding a code uniquely identifying the electronic data transmitted from the sender to the server into the return electronic message.

In accordance with the present disclosure, the method further includes the step of prompting the sender to visit a website associated with the server to provide indications of identity and confirmation of authorship of the transmitted electronic data.

In another aspect of the present disclosure, the computer implemented method further includes the following computer implemented steps: prompting the sender to draw a signature in a web-interface as an indication of the sender's identity and ownership of transmitted electronic data; and recording a copy of the signature at the server as a confirmation of the identity of the sender and as a confirmation of ownership of transmitted electronic data.

In still another aspect, the computer implemented method further includes the step of adding the indications of identity and confirmation of ownership of the sender to the electronic data transmitted from said server to the recipient. In yet another aspect, the electronic data is transmitted from the server to the recipient in the form of an electronic message.

In an even further aspect, the computer implemented method includes the step of transmitting a copy of the electronic data from the server to a recipient and further includes the step of digitally signing the copy of the electronic data.

In still another further aspect, the method includes the step of operating the server by a service for authentication of authorship of data.

In another aspect, the method further includes embedding a timestamp associated with the transmission of electronic data into the confirmation of the ownership of the electronic data transmitted from the server.

In still another aspect, the computer implemented method further includes the step of confirming the authorship of the electronic data transmitted from the server to the recipient, through a time stamp associated with the creation of said electronic data by the sender.

In yet another aspect, the present invention includes a system including a server having a processor that is controlled by software commands to receive an email or other information or data from a sender, send a message to the sender to authenticate that the sender is the owner of the email, data or information, and upon receiving confirmation from the sender, transmitting the email, data or information to the recipient.

Other features and advantages of the invention will become apparent from the following detailed description, taken in conjunction with the accompanying drawings, which illustrate, by way of example, the features of the invention.

BRIEF DESCRIPTION OF THE DRAWINGS

The invention will now be described with reference to the non-limiting drawings in which.

DETAILED DESCRIPTION OF THE PREFERRED EMBODIMENTS

The system and method of the present invention is explained with reference to email messages and network architecture necessary for the implementation of email system. It is to be understood that such an explanation is only for the purpose of illustration. The system and method envisaged by the present disclosure can be applied to other protocols and other message types without departing from the scope of the disclosure.

It will be understood by those skilled in the art of message and data transmission over networks that the various embodiments of the present invention may be implemented using servers, processors, data storage and various software programs, such as email systems, network protocols and the like as are known by those skilled in the art. For example, a server such as is described below will typically include one or more processors that are controlled by software programs to carry out the various steps described. Such a server will include communication ports for communication of data to and from the server. The communication port may also allow for information to be stored by the processor of server onto a data storage device, which may be any data storage or memory device known in the art. The processor may also communicate over a network, which may be wired or wireless, so as to implement the various embodiments of the present invention.

Figure 1:
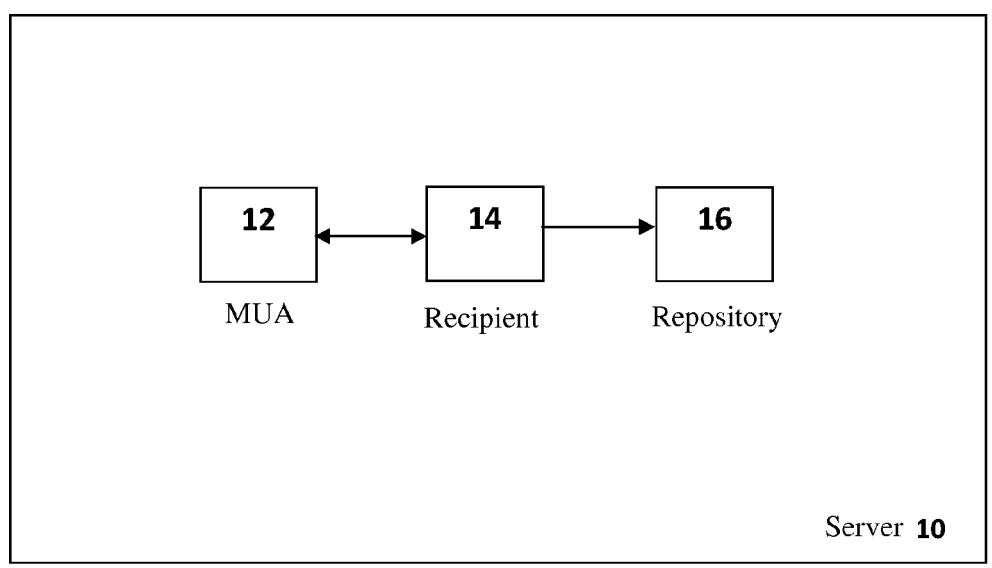
FIG. 1 illustrates a computer implemented system for authenticating a sender of electronic data to a recipient.

Referring to FIG. 1, there is shown a server 10. The server primarily acts as the outgoing mail transfer agent (MTA) for a message sender's mail user agent (MUA) 12. The MUA 12 is utilized by a sender to create an email message (electronic data). Possible MUAs' include client side email programs, server-side email programs, web based email programs and HTML pages submitted through websites/web services. The intended recipient/addressee/receiver of the message is denoted as the recipient 14. In accordance with this disclosure, the server 10 receives a message that is to be transmitted to a recipient. On receiving a message to be transmitted, the sever locally stores the message in a repository 16 and subsequently creates a plurality of fields corresponding to the message, in the repository 16. The fields created by the server include but are not restricted to the time at which the message was received, name of the attachments of the message, and the number of addresses of the message.

For every destination mentioned in the received message, the server 10 records at least the name of the destination, internet address of the destination, and the time at which the message was delivered to the destination's mail server. These records are subsequently stored in the repository 16.

Subsequent to receiving a message to be transmitted to a recipient, the MTA of the server 10 transmits another message, also referred to as a 'notification' to the corresponding sender asking for sender's confirmation of the ownership of the message. Typically the notification is sent in the form of an email message to the corresponding sender from the server 10, in order to confirm the ownership of the message that is needed to be transmitted from the server to an intended recipient. The server 10 modifies certain headers of the notification message in order to make sure that the sender's reply to the notification is sent to a place from where the server 10 can access and process the reply, and also to ensure that an appropriate reply is elicited from the sender. For example, if the name of the sender is 'john smith', and his web address is 'johnsmith@adomain.com', the server sends the notification to 'johnsmith@adomain.com'. The address of john smith is included in the 'TO' column of the notification message. Further, the server 10 automatically modifies some of the headers of the notification message to ensure that the reply from john smith is always accessible to the server 10 for processing. The notification message is sent to john smith's MUA (Mail User Agent) which is in turn requested to send the reply from john smith to an address specified by and accessible to the server 10 for processing.

Subsequently, the creator of the message (sender) replies to the notification message sent by the server, and confirms his/her ownership of the message that needs to be transmitted to an intended recipient. The ownership is confirmed by the sender typically via an email. Subsequent to receiving the confirmation of the ownership of the sender, the server 10 transmits the message received from the sender to the intended recipient. Along with the message, the proof of identity and proof of ownership of the sender is also embedded by the server 10. The proof of identity and proof of ownership of the sender may be embedded into the message, or may be included as a separate attachment to the message. Both the message with the embedded content, or the message with an attachment containing the identity of the sender and proof ownership may be encrypted for secure transmission over a network, such as the Internet.

When a message intended for a particular recipient is received by the server 10, the server 10 stores a local copy of the message in the repository 16. The server may also optionally modify the received message. For example, after the end of the message body, a web link or a web page address can be inserted by the server. The intended recipient may click on or otherwise activate the link to confirm the receipt of the message.

Further, the message may also be modified by the server in such a way that the message enables the recipient to go to a website by clicking on a hyperlink available as a part of the message, and subsequently compose a new message or reply to the received message, thereby confirming his/her identity.

In one embodiment, for every outgoing message, i.e., for every message sent from server 10 to the intended recipient, the server 10 creates a unique code/unique identification number corresponding to the message. The unique code can be a timestamp indicating the time at which the message was sent from the server 10. The unique code may also be stored in the repository 16 for future reference. Optionally, the unique code/identification number can also be embedded in the message that is sent to the recipient from the server 10. For example, the "FROM" field of the message can be augmented to contain the unique code of the message along with the address of the recipient of the message. Optionally, the unique code/identification number can also be included in the message when the message is received from the sender at the server. Optionally, the unique code/identification number can also be embedded in a web link or a web address that is sent as a part of the notification message, from server 10 to the sender.

The notification message transmitted from the server 10 to the sender may also prompt the sender to provide indications of his/her identity and also indication of the ownership of the message transmitted from the sender to the server 10. The sender could indicate his identity and ownership of the transmitted message by drawing/creating a digital signature on a user interface made available to the sender. The digital signature created by the sender is stored in the repository for further process and verification. Optionally, subsequent to transmitting the email message the intended recipient of the message can also be prompted to prove his/her identity. The recipient can also be prompted to draw a digital signature on a web interface made available to the recipient. Subsequently, the digital signature of the recipient is compared with signatures previously stored in the repository 16, and only on finding a match, the recipient is provided access to the email message sent by the server 10.

In another embodiment, the timestamp denoting the date and time at which the email message is transmitted from the server to the recipient is created and stored for further reference. Further, the date and time at which the sender provides indications of his identity and ownership, is also converted into a timestamp and is used as a confirmation of authorship/ownership of the user. This timestamp is also attached to the email message being sent from the server to the recipient, in order to assure the recipient of authenticity of the email message.

The indications of identity and ownership of the transmitted email message are embedded with the email message being transmitted to the recipient. This procedure is followed in order to assure the recipient that the message is from an authentic and genuine source. In an alternate embodiment of the present invention, the recipient of the message can also specify the indications of identity and ownership, required to be provided by the sender. In such cases the email message being sent to the recipient is augmented with the sender's indication of identity and ownership of the transmitted message.

In one embodiment of the present invention, the email message is transmitted in an encrypted format from the server 10 to the recipient. Any of the well-known public cryptography techniques can be utilized to encrypt the message sent from the server 10 to the recipient. The receiver, using any of the well-known techniques, decrypts the encrypted message.

Figure 2:
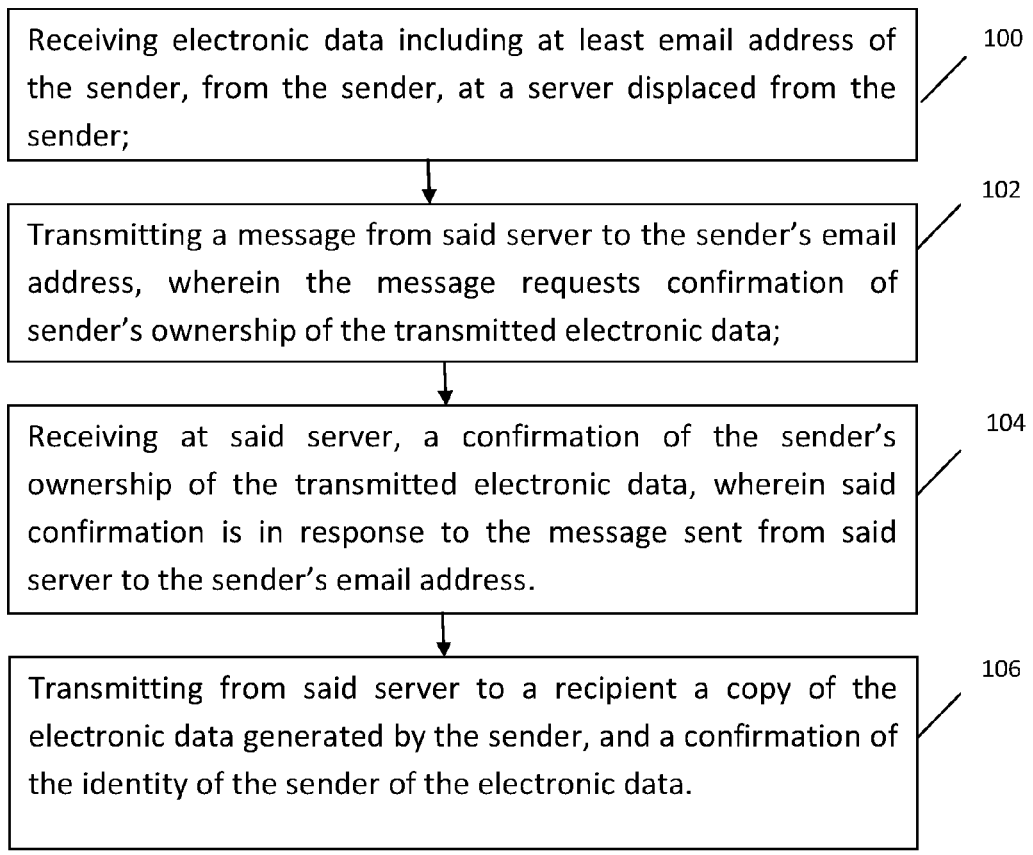
FIG. 2 illustrates a flowchart corresponding to the steps involved in the computer implemented method for authenticating a sender of electronic data to a recipient.

Referring to FIG. 2, there is shown a flowchart corresponding to an embodiment of a method for authenticating a sender of electronic data to a recipient.

In box 100, electronic data including at least an email address of the sender, is received from the sender at a server remote from the sender. In box 102, a message is transmitted from the server to the sender's email address, wherein the message requests confirmation of the sender's ownership of the transmitted electronic data.

A confirmation of the sender's ownership of the transmitted electronic data is received at the sender in box 104, wherein the confirmation is in response to the message sent from the server to the sender's email address 104. A copy of the electronic data generated by the sender, and a confirmation of the identity of the sender of the electronic data is transmitted from the server to the recipient in box 106.

In another embodiment, the method further includes the step of transmitting the electronic data from the sender to the server, in the form of an email message. In still another embodiment, the method further includes the step of transmitting the electronic data received from the sender to an internet web server for the purpose of delivery to the recipient.

In still another embodiment, the step of receiving electronic data including at least email address of the sender, further includes the step of recording at the server, a code uniquely identifying the transmitted electronic data.

In another embodiment, the computer implemented method includes the step of transmitting a message from the server to the sender's email address and further includes the step of embedding a link to a website associated with the server in the message. In another embodiment, the computer implemented method includes the step of embedding a code uniquely identifying the transmitted electronic data into the link.

In another embodiment, the method further includes the step of confirming sender's ownership of the transmitted data via a return electronic message. Another embodiment may include the step of embedding the code uniquely identifying the electronic data transmitted from the sender to the server, into the return electronic message.

In still another embodiment, the method may further include the step of prompting the sender to visit a website associated with the server to provide indications of identity and confirmation of authorship of the transmitted electronic data.

In yet another embodiment, the computer implemented method further includes the following computer implemented steps: prompting the sender to draw a signature in a web-interface as an indication of the sender's identity and ownership of transmitted electronic data; and recording a copy of said signature at said server as a confirmation of the identity of the sender and as a confirmation of ownership of transmitted electronic data.

In accordance with another embodiment of the present disclosure, the computer implemented method further includes the step of adding the indications of identity and confirmation of ownership of the sender, to the electronic data transmitted from said server to the recipient. In another embodiment, the method includes the step of transmitting the electronic data from said server to the recipient in the form of an electronic message. In still another embodiment, the computer implemented method includes the step of transmitting from said server to a recipient a copy of the electronic data further includes the step of digitally signing the copy of the electronic data. In yet another embodiment, the method includes the step of operating said server by a service for authentication of authorship of data.

In another embodiment, the method further includes the step of embedding a timestamp associated with the transmission of electronic data into confirmation of the ownership of the electronic data transmitted from the server. In still another embodiment, the computer implemented method further includes the step of confirming the authorship of the electronic data transmitted from the server to the recipient, through a time stamp associated with the creation of said electronic data by the sender.

The various embodiments of the present invention are advantageous in that they provide a system and method that provides for secured data transmission, enables sender to avail proof of delivery of the message to the intended recipient, and provides for a system and method which is not cumbersome and slow in terms of implementation. Moreover, the various embodiments provide a system and method that does not require both the sender and receiver to connect to a website in order to receive a message, does not warrant the sender to upload the data/files/documents to a third party website, for the purpose of transmitting then to an intended recipient, does not require installation of any special email/data transfer software on the part of sender and receiver for sending/receiving the data, and which provides a system that enables secured, tamperproof transmission of data. A further advantage is that the various embodiments of the present invention provide a method that creates and saves a digital signature for every message transmitted using the method.

While considerable emphasis has been placed herein on the various components of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

I claim:

1. A computer implemented method for authenticating a sender of electronic data to a recipient, said method comprising the following computer implemented steps:
    receiving from the sender, at a server remote from the sender, electronic data including at least an email address of the sender;
    transmitting a message from the server to the sender's email address, the message requesting proof of the sender's identity and ownership of the transmitted electronic data, the message
    prompting the sender to visit a website associated with the server to provide indications of identity and confirmation of authorship of the transmitted electronic data, and
    prompting the sender to draw a signature in a web-interface of the website as the indication of the sender's identity and ownership of the transmitted electronic data;
    receiving at the server a copy of the signature as a proof of the sender's identity and ownership of the transmitted electronic data, the proof being sent in response to the message sent from the server to the sender's email address;
    recording the copy of the signature at the server as a confirmation of the sender's identity and ownership of the transmitted data;
    embedding the proof of the sender's identity and ownership of the transmitted electronic data, into the electronic data; and
    transmitting a copy of the electronic data generated by the sender with the proof of the sender's identity and ownership embedded, from the server to a recipient.

2. The computer implemented method as claimed in claim 1, wherein the method further includes the step of transmitting the electronic data from the sender to the server, in the form of an email message.

3. The computer implemented method as claimed in claim 1, wherein the method further includes the step of transmitting the electronic data received from the sender to an internet web server for the purpose of delivery to the recipient.

4. The computer implemented method as claimed in claim 1, wherein the step of receiving electronic data including at least email address of the sender, further includes the step of recording at the server, a code uniquely identifying the transmitted electronic data.

5. The computer implemented method as claimed in claim 1, wherein the step of transmitting a message from said server to the sender's email address further includes the step of embedding in said message, a link to a website associated with the server.

6. The computer implemented method as claimed in claim 5, wherein said method further includes the step of embedding a code uniquely identifying the transmitted electronic data, into said link.

7. The computer implemented method as claimed in claim 1, wherein said computer implemented method further includes the step of adding the indications of identity and confirmation of ownership of the sender, to the electronic data transmitted from said server to the recipient.

8. The computer implemented method as claimed in claim 1, wherein the method further includes the step of transmitting the electronic data from said server to the recipient in the form of an electronic message.

9. The computer implemented method as claimed in claim 1, wherein the step of transmitting from said server to a recipient a copy of the electronic data further includes the step of digitally signing the copy of the electronic data.

10. The computer implemented method as claimed in claim 1, wherein the method further includes the step of operating said server by a service for authentication of authorship of data.

11. The computer implemented method as claimed in claim 1, wherein the method further includes the step of embedding a timestamp associated with the transmission of electronic data into confirmation of the ownership of the electronic data transmitted from the server.

12. The computer implemented method as claimed in claim 11, wherein the method further includes the step of confirming the authorship of the electronic data transmitted from the server to the recipient, through a timestamp associated with the creation of said electronic data by the sender.

13. A system for authenticating a sender of electronic data to a recipient, comprising:
a server computer having a processor programmed by software commands to
receive electronic information from a sender,
transmit a message to the sender asking the sender for proof of identity and ownership of the received electronic information, the message requesting proof of the sender's identity and ownership of the transmitted electronic data, the message
prompt the sender to visit a website associated with the server to provide indications of identity and confirmation of authorship of the transmitted electronic data, and
prompt the sender to draw a signature in a web-interface of the website as the indication of the sender's identity and ownership of the transmitted electronic data,
receive a copy of the signatures as a proof of the sender's identity and ownership of the received electronic information from the sender authenticating the sender to the email,
record the copy of the signature as a combination of the sender's identity and ownership of the transmitted data;
embed the proof of the sender's identity and ownership of the transmitted electronic information, into the electronic information; and
transmit the electronic information with the proof of sender's identity and ownership embedded to a recipient.

14. The system of claim 13, wherein the processor is further programmed to assign a code to the transmitted electronic information uniquely identifying the transmitted electronic information.

15. The system of claim 14, wherein the code is embedded into the transmitted electronic information.

16. The system of claim 13, wherein the processor is programmed to embed a link to a website into the electronic information and transmit the electronic information, the confirmation and the link to the recipient.

* * * * *

UNITED STATES PATENT AND TRADEMARK OFFICE
CERTIFICATE OF CORRECTION

PATENT NO. : 9,160,725 B2  
APPLICATION NO. : 13/624769  
DATED : October 13, 2015  
INVENTOR(S) : Terrance A. Tomkow It is certified that error appears in the above-identified patent and that said Letters Patent is hereby corrected as shown below:

Claims

Column 8, line 34, Claim 4, between "least" and "email" insert --the--.

Column 9, line 16, Claim 13, delete "prompt" and insert instead --prompting--.

Column 9, line 20, Claim 13, delete "prompt" and insert instead --prompting--.

Column 10, line 1, Claim 14, delete "signatures" and insert instead --signature--.

Signed and Sealed this  
Twenty-ninth Day of March, 2016

Michelle K. Lee  
*Director of the United States Patent and Trademark Office*